United States Patent
Levine et al.

(10) Patent No.: US 10,467,666 B2
(45) Date of Patent: Nov. 5, 2019

(54) METHODS AND SYSTEMS FOR TRACKING ELECTRONIC COMMERCE TRANSACTIONS

(71) Applicant: RAKUTEN MARKETING LLC, New York, NY (US)

(72) Inventors: Jonathan Levine, New York, NY (US); Matthew Syrett, Brooklyn, NY (US); Steven Silverstein, Brooklyn, NY (US); Nathan Bryant, Norwalk, CT (US); Shaochen Fan, Salisbury Mills, NY (US)

(73) Assignee: RAKUTEN MARKETING LLC, New York, NY (US)

( * ) Notice: Subject to any disclaimer, the term of this patent is extended or adjusted under 35 U.S.C. 154(b) by 0 days.

(21) Appl. No.: 13/621,479

(22) Filed: Sep. 17, 2012

(65) Prior Publication Data

US 2013/0018721 A1    Jan. 17, 2013

Related U.S. Application Data (63) Continuation of application No. 12/254,809, filed on Oct. 20, 2008, now Pat. No. 8,271,329.
(Continued)

(51) Int. Cl.
    *G06Q 30/02*    (2012.01)
    *G06Q 30/06*    (2012.01)
    *H04L 9/32*     (2006.01)

(52) U.S. Cl.
    CPC ......... *G06Q 30/0601* (2013.01); *G06Q 30/02* (2013.01); *G06Q 30/0273* (2013.01);
(Continued)

(58) Field of Classification Search
    CPC ..... G06Q 30/00; G06Q 30/02; G06Q 30/0246
    (Continued)

(56) References Cited

U.S. PATENT DOCUMENTS

| 5,319,542 A | 6/1994 | King, Jr. et al. |
| 5,537,314 A | 7/1996 | Kanter |

(Continued)

FOREIGN PATENT DOCUMENTS

| KR | 2000-0007010 | 2/2000 |
| WO | WO 01/37158 | 5/2001 |

OTHER PUBLICATIONS

Selected document from internet.com Web site entitled "DoubleClick, 24/7 Media, L90 Settle Patent Suits" by Pamela Parker., downloaded and printed Jan. 18, 2001 (3 pages).
(Continued)

*Primary Examiner* — Marilyn G Macasiano
(74) *Attorney, Agent, or Firm* — Troutman Sanders LLP (57) ABSTRACT

Systems and methods are disclosed for tracking user access to an advertisement and user transactions with an electronic commerce computer associated with the advertisement. In accordance with one aspect of the disclosed technology, a transaction tracking computer associates an identifier with each access (e.g., click) of an advertisement. Transactions that occur at the electronic commerce computer that are related to the advertisement will be reported to the transaction tracking server together with the identifier. In one embodiment, if the reported transaction is a duplicate of a previously reported transaction, then the reported transaction is determined to be invalid. In one embodiment, if the reported transaction occurs more than a predetermined amount of time after the time the identifier was initially generated, then the reported transaction will also be determined to be invalid.

20 Claims, 5 Drawing Sheets

Related U.S. Application Data (60) Provisional application No. 60/980,970, filed on Oct. 18, 2007.

(52) U.S. Cl.
CPC .......... *H04L 9/3236* (2013.01); *H04L 9/3297* (2013.01); *H04L 2209/56* (2013.01)

(58) Field of Classification Search
USPC .............. 705/14.47, 80, 14.45, 45; 709/224; 713/176; 235/375
See application file for complete search history.

(56) References Cited

U.S. PATENT DOCUMENTS

| | | | |
|---|---|---|---|
| 5,590,197 | A | 12/1996 | Chen et al. |
| 5,692,206 | A | 11/1997 | Shirley et al. |
| 5,708,780 | A | 1/1998 | Levergood et al. |
| 5,710,884 | A | 1/1998 | Dedrick |
| 5,712,979 | A | 1/1998 | Graber et al. |
| 5,715,314 | A | 2/1998 | Payne et al. |
| 5,715,315 | A | 2/1998 | Handelman |
| 5,717,860 | A | 2/1998 | Graber et al. |
| 5,724,424 | A | 3/1998 | Gifford |
| 5,745,681 | A | 4/1998 | Levine et al. |
| 5,796,952 | A | 8/1998 | Davis et al. |
| 5,812,769 | A | 9/1998 | Graber et al. |
| 5,819,285 | A | 10/1998 | Damico et al. |
| 5,848,396 | A | 12/1998 | Gerace |
| 5,855,008 | A | 12/1998 | Goldhaber et al. |
| 5,873,076 | A | 2/1999 | Barr et al. |
| 5,937,392 | A | 8/1999 | Alberts |
| 1,948,061 | A | 9/1999 | Merriman et al. |
| 5,948,016 | A | 9/1999 | Jang |
| 5,991,735 | A | 11/1999 | Gerace |
| 5,991,740 | A | 11/1999 | Messer |
| 5,999,914 | A | 12/1999 | Blinn |
| 6,006,197 | A | 12/1999 | d'Eon et al. |
| 6,016,504 | A | 1/2000 | Arnold et al. |
| 6,029,141 | A | 2/2000 | Bezos et al. |
| 6,041,309 | A | 3/2000 | Laor |
| 6,047,327 | A | 4/2000 | Tso et al. |
| 6,055,513 | A | 4/2000 | Katz et al. |
| 6,141,666 | A | 10/2000 | Tobin |
| 6,173,271 | B1 | 1/2001 | Goodman et al. |
| 6,226,618 | B1 | 5/2001 | Down et al. |
| 6,240,455 | B1 | 5/2001 | Kamasaka |
| 6,427,140 | B1* | 7/2002 | Ginter et al. .................. 705/80 |
| 6,804,660 | B2 | 10/2004 | Landau et al. |
| 7,028,886 | B1* | 4/2006 | Maloney ...................... 235/375 |
| 7,505,913 | B2 | 3/2009 | Tobin |
| 2001/0034646 | A1 | 10/2001 | Hoyt et al. |
| 2002/0002538 | A1 | 1/2002 | Ling |
| 2002/0010623 | A1 | 1/2002 | McCollum et al. |
| 2002/0019781 | A1 | 2/2002 | Shooks et al. |
| 2002/0042739 | A1 | 4/2002 | Srinivasan |
| 2002/0147600 | A1* | 10/2002 | Waters et al. ..................... 705/1 |
| 2004/0064703 | A1* | 4/2004 | Makita .......................... 713/176 |
| 2005/0222906 | A1 | 10/2005 | Chen |
| 2006/0136294 | A1* | 6/2006 | Linden et al. .................. 705/14 |
| 2006/0200555 | A1 | 9/2006 | Shannon et al. |
| 2006/0265493 | A1* | 11/2006 | Brindley et al. .............. 709/224 |
| 2007/0179849 | A1 | 8/2007 | Jain |
| 2009/0011781 | A1 | 1/2009 | Merrill et al. |

OTHER PUBLICATIONS

Search results on Internet related patents.
Abstract of U.S. Pat. No. 5,537,314.
John A. Quelch, "The Internet and International Marketing," Sloan Management Review, v37, n. 3, pp. 60-75, Spring 1996.
Selected documents from books.com Web site describing Book Stack's Unlimited's Links Partner Program, downloaded and printed Jun. 20, 1997 and Jun. 23, 1997 (8 pages).
Selected document from Incognito Cafe Web site describing several on-line Bookstore Links, undated (5 pages).
Full text article from Dialog search titled "Booksite launches version 3.0 of the popular electronic commerce web site", Business Wire, Feb. 23, 1996, p. 02231111 (2 pages).
Full text article from Dialog search titled Amazon.com Introduces 'Amazon.com Associates'—A New Model for Internet-Based Commerce, Business Wire, Jul. 18, 1996, p. 07181040 (3 pages).
Text journal article for Dialog search titled "Can mixing 'cookies; with online marketing be a recipe for heartburn?" by Foster, Ed, InfoWorld, v18n30 pp. 54, Jul. 22, 1996 (2 pages).
Full text journal article from Dialog search titled "Real-Time Travel Info Available Online", Newsbytes News Network, p. N/A, Jan. 17, 1995 (2 pages).
Abstract from Dialog search titled "Online growth 'virtually' untapped; PC vendors taking more advantage of booming sales . . . " by Harrington, Mark, Computer Retail Week, v4, n64, p. 160 (1), Jun. 6, 1994 (1 page).
Full text titled "GroupLens: An Open Architecture for Collaborative Filtering of Netnews" by Paul Resnick et al., from Proceedings of ACM 1994 Conference on Computer Supported Cooperative Work, Chapel Hill, NC: pp. 175-186 (18 pages).
Full text titled "Fab: Content-Based, Collaborative Recommendation" by Marko Balabanovic et al., Communications of the ACM, Mar. 1997, vol. 40, No. 3 (8 pages).
Krick, J., "A cookie for thoughts: cookies help webmasters harness user habits," Computer Shopper, v17, n7, p. 610(1).
Full text article from Dialog search titled "Networking and the rise of electronic commerce: The challenge for public policy," Business Economic, v30n4, Oct. 1995, p. 01097255 (10 pages).
Bruce Judson, "Luring Advertisers Prospects to the Web", Advertising Age, p. 16, Aug. 7, 1995.
Wariness hinders online sales, Anonymous. Bank Advertising News. North Palm Beach: Aug. 7, 2000. vol. 24, Iss. 16, p. 3.
International Search Report; PCT/US2008/080563 dated Dec. 10, 2008.

\* cited by examiner

METHODS AND SYSTEMS FOR TRACKING ELECTRONIC COMMERCE TRANSACTIONS

CROSS-REFERENCE TO RELATED APPLICATIONS

This application is a continuation of U.S. patent application Ser. No. 12/254,809 filed Oct. 20, 2008, issued as U.S. Pat. No. 8,271,329 which claims priority from U.S. Provisional Application No. 60/980,970 filed Oct. 18, 2007. Each of these applications are hereby incorporated by reference.

FIELD OF THE INVENTION

The present invention relates generally to electronic transaction tracking, and more specifically, to tracking of electronic transactions in connection with advertisements.

BACKGROUND OF THE INVENTION

As the Internet and World Wide Web continue to expand, and as increasing numbers of households and businesses join the online marketplace, opportunities for merchants and consumers to reach each other will continue to increase. The environment of electronic commerce involves challenges and advantages different from those of a physical marketplace. This is especially true in the area of advertising. Electronic advertising in the Internet marketplace is vastly different from paper advertisements in the physical marketplace in many ways. One significant difference is that electronic commerce is not bounded by physical proximity; once there is access to the Internet, there is also access to the entire Internet marketplace. Thus, the audience for electronic advertising can potentially be the entire online population. Another difference is that participants in electronic commerce have the ability to gather various types of information without marketplace or consumer surveys. Thus, certain labor costs associated with advertising in the physical marketplace are reduced or non-existent in the electronic marketplace.

On the other hand, the differences of the Internet marketplace also present challenges for electronic advertising. Electronic advertising involves technological competence and equipment that interested market participants may not possess. Additionally, electronic advertising involves economics that may be quite different from the economics of advertising in the physical marketplace. Accordingly, there is continued interest in further developing and improving various aspects of electronic advertising and of the Internet marketplace to address these and other challenges.

SUMMARY OF THE INVENTION

The disclosed technology provides systems and methods for tracking electronic commerce transactions. In certain embodiments, the disclosed technology provides tracking of electronic commerce transactions in connection with electronic advertising. In one aspect of the disclosed technology, each access to an advertisement (e.g., click of an advertisement) can be tracked. In one embodiment, by separately tracking each access to an advertisement, the disclosed technology can determine fraudulent activity on a click-by-click basis. Examples of fraudulent activity can include generating non-existence accesses to an advertisement (e.g., non-existent clicks), generating copies of existing accesses to an advertisement (e.g., copying a click), and/or intercepting a valid access to an advertisement and replacing it with false information. In one aspect of the disclosed technology, an electronic commerce computer can report transactions to a transaction tracking computer for recording. In one embodiment, transactions can be reported using, for example, a pixel beacon and/or a script in a Web page. In one embodiment, transactions can be reported using a Web service using, for example, HTTP, POST, and/or GET commands.

Other features and advantages of the invention will become more apparent when considered in connection with the accompanying drawings and detailed description.

DETAILED DESCRIPTION

The disclosed technology provides systems and methods for tracking electronic commerce transactions in the Internet marketplace. Various aspects of the disclosed technology also relate to electronic advertisements. The particular embodiments described herein are exemplary and do not limit the scope of the disclosed technology.

Some examples of tracking technologies are described in the following U.S. Patents and Patent Applications: U.S. Pat. Nos. 5,997,740, 7,020,622, 7,127,419, 7,395,226, and U.S. patent application Ser. Nos. 10/192,256, 10/868,682, 09/771,135. The entire contents of these U.S. Patents and U.S. Patent Applications are incorporated by reference herein.

Figure 1:
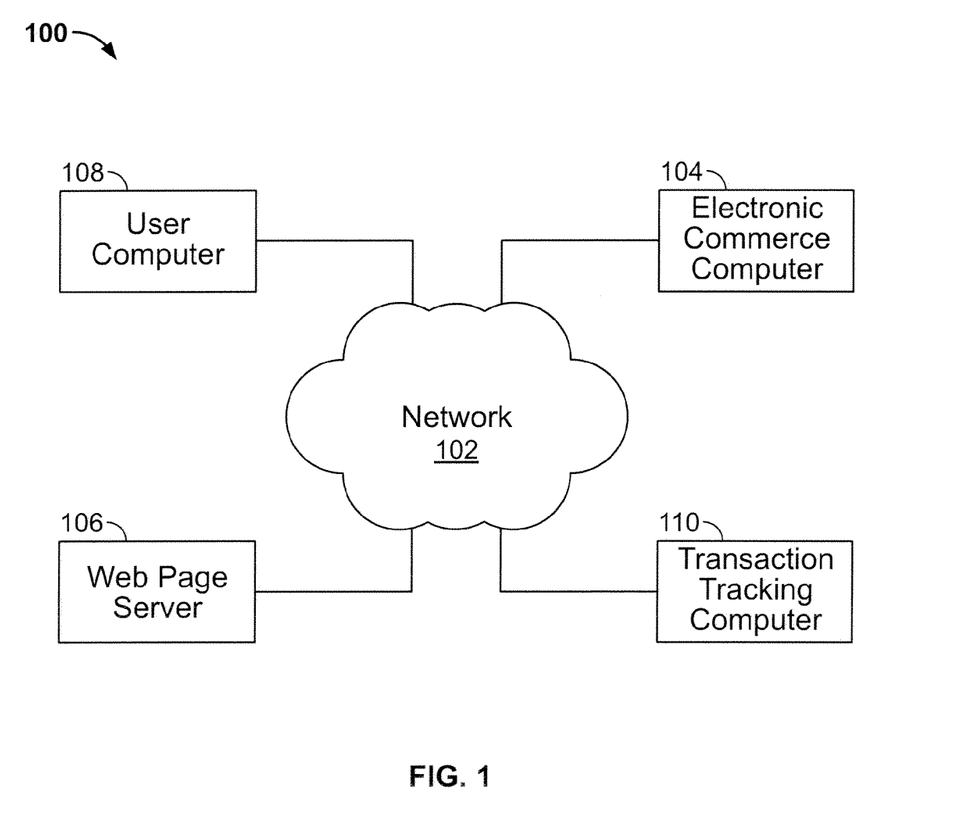
FIG. 1 is a block diagram illustrating an exemplary Internet marketplace, its participants, and associated equipment, in accordance with one embodiment of the disclosed technology.

Referring now to FIG. 1, there is shown a block diagram of one embodiment of an Internet marketplace infrastructure 100 in accordance with the disclosed technology. The Internet marketplace infrastructure 100 includes a network 102 that may include one or more telecommunication devices such as routers, hubs, gateways, and the like, as well as one or more connections such as wired connections or wireless connections. In different embodiments, the network 102 can include different numbers of telecommunication devices and connections and can span a range of different geographies. In different embodiments, the network 102 can include all or portions of a wired telephone infrastructure, a cellular telephone infrastructure, a cable television infrastructure, and/or a satellite television infrastructure.

Various Internet marketplace participants are in communication with the network 102, including one or more electronic commerce computers 104, Web page servers 106, and user computers 108. As used herein, the term "computer" includes any system or device that can execute machine instructions, including, for example, desktops, laptops, servers, handheld devices, television set top boxes, and/or networked computing systems, or multiples or combinations thereof. The electronic commerce computer 104 enables electronic transactions such as, for example, electronic shopping, payment, and/or account management transactions. For example, the electronic commerce computer 104 may electronically display goods or services that Internet shoppers can order and purchase electronically, such as clothing or groceries, or shipping and transportation services. The Web page server 106 includes Web pages and Web server software that can provide the Web pages to systems or devices requesting them. The Web pages can include a myriad of different media and content, including, for example, a search interface, shopping content, news content, video or audio content, and/or animations, among others.

The electronic commerce computer 104, the Web page server 106, and the user computer 108 can each include hardware such as network communication devices, storage medium/devices, processors, memory, computer boards, optical or magnetic drives, and/or human interface devices, and software such as operating system software, Web server software, Web browsing software, database management software, software supporting various communication protocols, and/or software supporting various programming languages. In one embodiment, the user computer 108 includes Web browsing software that can request Web pages from the Web page server 106 and that can transact electronic commerce in the electronic commerce computer 104.

In accordance with one aspect of the disclosed technology, and with continuing reference to FIG. 1, the Internet marketplace infrastructure 100 also includes a transaction tracking computer 110 that is in communication with the network 102. The transaction tracking computer 110 can include the hardware and software components described above in connection with the marketplace participants 104, 106, 108. In various embodiments, the transaction tracking computer 110 can communicate, through the network 102, with the user computer 108, the Web page server 106, and/or the electronic commerce computer 104. The transaction tracking computer 110 will be described in more detail below in connection with FIGS. 2-4.

In the Internet marketplace infrastructure 100 of FIG. 1, users at their computers 108 may access Web pages in the Web page server 106 but, for any number of reasons, may not visit the electronic commerce computer 104, which can be a shopping Web site, for example. This may be because users may not know that the electronic commerce computer 104 exists and/or may not be aware of new electronic commerce opportunities at the electronic commerce computer 104. In order to reach potential consumers and increase the number of electronic consumers accessing the electronic commerce computer 104, electronic advertisements may be placed in various Web pages throughout the Internet marketplace 100 to inform users about the electronic commerce computer 104 and/or its merchandise. In this role, the electronic commerce computer 104 can also be referred to as an "advertiser." The electronic advertisements can include different types of advertisements, including banner ads or pop-up ads, and can include different types of content, such as text, graphics, video, audio, and/or animation.

As mentioned above herein, the economics of electronic advertising are vastly different from that of advertising in the physical marketplace. Referring again to FIG. 1, there may be a fee associated with placing advertisements on the Web page server's Web pages 106 to inform users accessing those Web pages about the electronic commerce computer 104 or its merchandise. Different ways of computing such a fee are possible. For example, the fee may be based on the number of users who visit the electronic commerce computer 104 after accessing an advertisement in a Web page on the Web page server 106, and/or based on the number of users who thereafter complete a purchase at the electronic commerce computer 104. This type of fee system will require tracking of electronic commerce transactions. Also as mentioned above herein, participants in the Internet marketplace 100 may wish to compile information about electronic commerce transactions without using marketplace or consumer surveys. Compiling such information will also require tracking of electronic commerce transactions. The sections below will describe various aspects of tracking electronic commerce transactions in accordance with the disclosed technology. The examples and reasons provided thus far for needing tracking of electronic commerce transactions are merely illustrative and do not limit the scope of the disclosed technology. There are other reasons and applications that need tracking of electronic commerce transactions and the disclosed technology apply to those as well.

Figure 2:
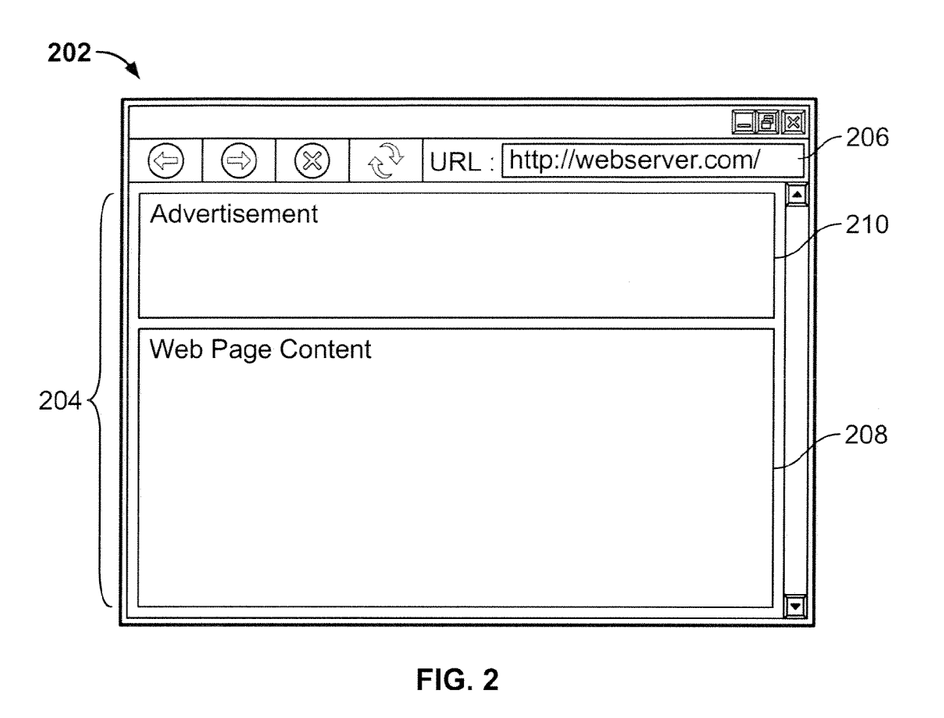
FIG. 2 is a diagram illustrating one example of a Web browser that is displaying a Web page from a Web page server.

Referring to FIG. 2, there is shown an exemplary diagram of a Web browser 202 that is displaying a Web page 204. Those skilled in the art will understand that a Web browser is software that is located on a computer. As used herein, the term "computer" can include any system or device that can execute machine instructions, including, for example, desktops, laptops, servers, handheld devices, television set top boxes, and/or networked computing systems, or multiples or combinations thereof. Additionally, those skilled in the art will understand that a "Web page" refers to a collection of different things, including, for example, visual content displayed on a screen (e.g., text, picture, video, buttons, etc.), software code causing the visual content to be displayed, as well as other software code that do not cause anything to be displayed but perform certain functionality in connection with the Web page. With continuing reference to FIG. 2, the Web browser 202 includes a field for specifying a Uniform Resource Locator ("URL") 206. Those skilled in the art will understand that a URL specifies the "electronic address" of a Web page, that is, the electronic address where the Web page can be accessed by a Web browser. In the illustration, the URL 206 shows that the Web browser 202 is accessing the Web page 204 from an electronic address shown as "http://webserver.com." Referring also to FIG. 1, the electronic address "http://webserver.com" can be located on the Web page server 106, and the Web browser 202 can be located on the user computer 108. When the Web browser 202 at the user computer 108 accesses the URL "http://webserver.com", the user computer 108 and the Web page server 106 communicate with each other and cause the visual components of the Web page 204 to be displayed on a screen at the user computer 108. At the same time, software code associated with the Web page 204 is also communicated to the user computer 108.

In one aspect of the disclosed technology, a Web page in accordance with the disclosed technology results from collaboration among an advertiser/electronic commerce computer 104, a Web page server 106, and a tracking computer 110. Specifically, referring to FIG. 2 as an example, the Web page 204 includes Web page content 208 and an advertisement 210. Those skilled in the art will recognize that different systems and methods exist for providing an advertisement in a Web page. Such systems and methods can be used to provide the advertisement 210. In the illustrated embodiment, the advertisement 210 includes visual content that informs a user about the electronic commerce computer 104 (in FIG. 1) and/or its merchandise. A user who may have accessed the URL 206 because of interest in the Web page content 208 may see the advertisement 210 and become interested in visiting the electronic commerce computer 104. In the illustrated embodiment, the advertisement 210 includes software code (associated with the Web page 204 but not visible to the user) that executes when a user accesses the advertisement 210, such as by clicking it with an on-screen pointer. In accordance with one aspect of the disclosed technology, the software code, when executed, causes the user computer 108 to communicate information to the transaction tracking computer 110 (in FIG. 1), to inform the transaction tracking computer 110 that a user is interested in visiting the electronic commerce computer 104 by reason of an advertisement.

The software code can cause the user computer 108 to communicate different types of information to the transaction tracking computer 110, including information about the user, information about the Web page server 106, information about the Web page content 208, and/or information about the advertisement 210. In one embodiment, information about the user can include a user identifier, which can be, for example, a user ID required to access the Web page 204 or an IP (internet protocol) address for the user. The user ID may be entered by the user or stored by the Web browser 202 by way of, for example, a cookie. In one embodiment, information about the user can include a list of Web sites previously visited by the user. In one embodiment, information about the Web page server 106 can be the URL 206 and/or a unique identifier associated with the Web page server 106. The unique identifier associated with the Web page server can be assigned in advance by the transaction tracking computer 110 (which requires advance collaboration between the Web page server 106 and the transaction tracking computer 110). In one embodiment, information about the advertisement can include an advertisement identifier that uniquely identifies the particular advertisement 210 shown in the Web page 204. This advertisement identifier may be assigned in advance by the transaction tracking computer 110 and/or by the advertiser/electronic commerce computer 104. Those skilled in the art will recognize how software code for performing the above functionality can be implemented. For example, the software code can be implemented in HTML (hyper-text markup language) using GET or POST methods, or implemented using a scripting language such as Javascript. Other implementations are contemplated and are within the scope of the disclosed technology.

Figure 3:
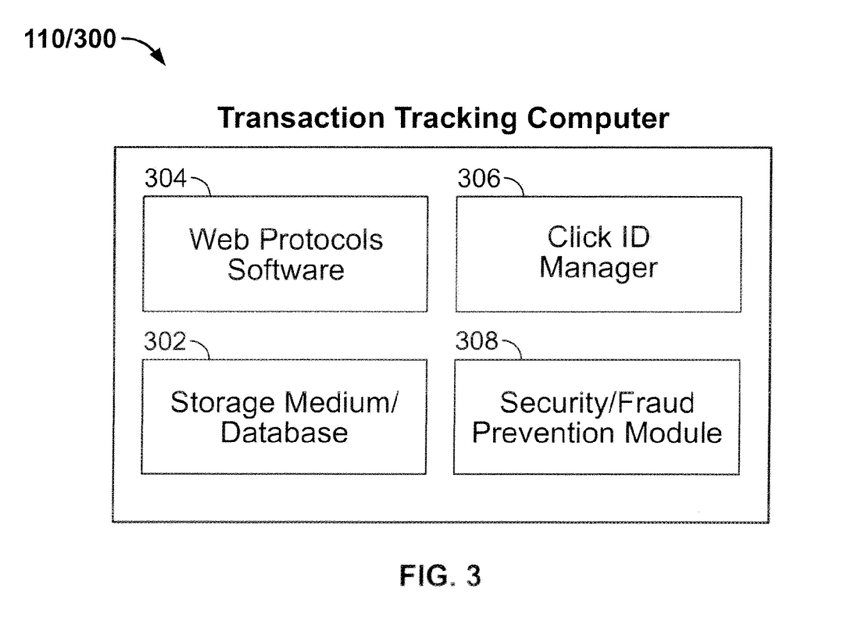
FIG. 3 is a block diagram illustrating components of an exemplary transaction tracking computer.
Figure 4:
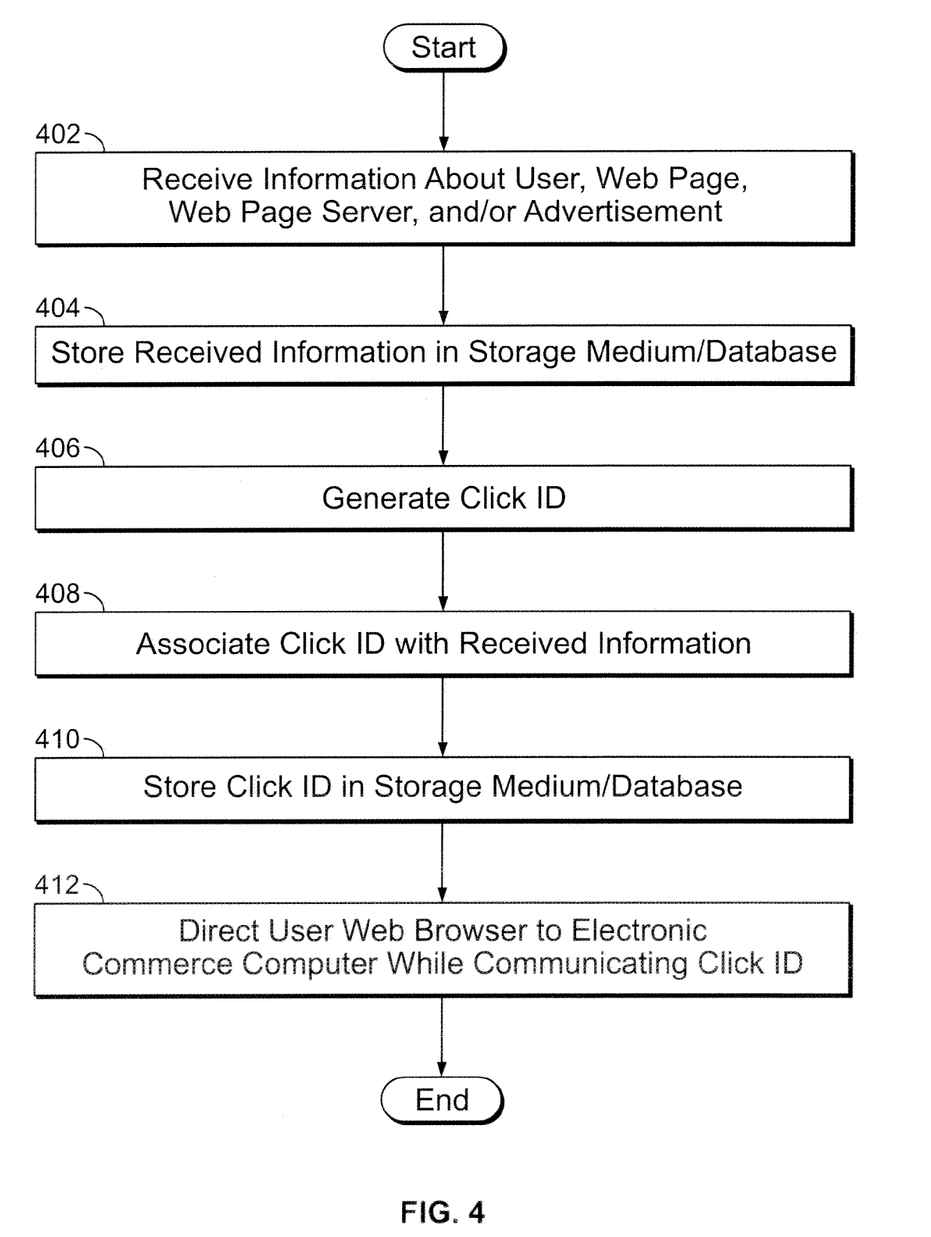
FIG. 4 is a flow chart illustrating exemplary operations of the transaction tracking computer of FIG. 3.

Turning now to aspects of the transaction tracking computer, FIG. 3 is a block diagram of exemplary components in a transaction tracking computer, and FIG. 4 is a flow chart of exemplary tasks performed by a transaction tracking computer. Referring now to FIG. 3, the transaction tracking computer 300 can include storage mediums/databases 302 for storing information and/or identifiers received from the user computer (108, FIG. 1) and Web protocols software 304 that manages communications using various Web protocols. The Web protocols software 304 can communicate with the storage medium/database 302 to store and/or retrieve information. The transaction tracking computer also includes what will referred to herein as a "clickID manager" 306, which can be implemented in software and will be described in more detail in connection with FIGS. 4-6. The transaction tracking computer can include a security/fraud prevention module 308, which will be discussed in detail later herein. The transaction tracking computer 300 can include other software and hardware components not illustrated in FIG. 3, including hardware such as network communication devices, processors, memory, computer boards, optical or magnetic drives, and/or human interface devices, and software such as operating system software, Web server software, database management software, software supporting various communication protocols, and/or software supporting various programming languages.

Referring now to FIG. 4, there is shown a flow chart of exemplary tasks performed by a transaction tracking computer. After a user accesses an advertisement in a Web page, the transaction tracking computer receives information about the user, the Web page, the Web page server, and/or the advertisement (402), and the received information is stored in the storage medium/database (404). The clickID manager generates an identifier referred to herein as a "clickID" (406). In one aspect of the disclosed technology, the clickID manager generates a unique identifier each time it receives an indication that a user has accessed an advertisement (402). This allows the transaction tracking computer to ensure that different transactions will be identified by different identifiers. The clickID identifier can be implemented as a number, a character string, or as another format. In one embodiment, the clickID identifier can include the date and time at which it was generated, which can include year, month, day, hour, minute, and/or second information. Because the transaction tracking computer may receive multiple indications of advertisement accesses during any given second, the clickID can also include a sub-second portion to distinguish different advertisement clicks received during the same second. For example, a clickID of "11222007163812001" can be generated for the first advertisement access notification received by the transaction tracking computer at Nov. 22, 2007, 16:38:12, and a clickID of "11222007163812002" can be generated for the second advertisement access notification received by the transaction tracking computer at Nov. 22, 2007, 16:38:12, and so on. This manner of generating a clickID is exemplary and does not limit the scope of the disclosed technology. Other ways of generating a clickID are contemplated and are within the scope of the disclosed technology.

With continuing reference to FIG. 4, the transaction tracking computer associates the generated clickID with the received information indicating an advertisement access (408), and the clickID is stored in the storage medium/database (410). The transaction tracking computer then directs the user computer Web browser to the electronic commerce computer while communicating the clickID (412). In one embodiment and referring also to FIG. 1, the transaction tracking computer 110 can direct the user computer's Web browser to the electronic commerce computer 104 by providing the user computer 108 with the electronic commerce computer's URL. This will cause the user computer 108 to request a Web page from the electronic commerce computer 104. Those skilled in the art will recognize that a URL can have an "electronic address" portion and a "data field" portion. In one embodiment, the transaction tracking computer 110 can communicate the clickID by inserting the clickID into the data field portion of the URL provided to the user computer 108, while maintaining the electronic address of the electronic commerce computer 104 in the electronic address portion of the URL. If the electronic address of the transaction commerce computer 104 is "http://www.shopping.com/home.xml", then an example of a URL that also includes a clickID may be "http://www.shopping- .com/home.xml?c=11222007163812001". When the transaction tracking computer 110 sends this URL to the user computer 108, the user computer 108 will request the Web page "http://www.shopping.com/home.xml" from the electronic commerce computer 104 while allowing the electronic commerce computer 104 to receive the clickID of 11222007163812001. Those of ordinary skill in the art will recognize that other ways exist to direct the user Web browser to the electronic commerce computer while communicating the clickID (412, FIG. 4). These other ways are also within the scope of the disclosed technology.

What has been described thus far are methods and systems for tracking a user access to an advertisement and directing the user's Web browser to an electronic commerce computer associated with the advertisement. Aspects of the electronic commerce computer will now be described.

Figure 5:
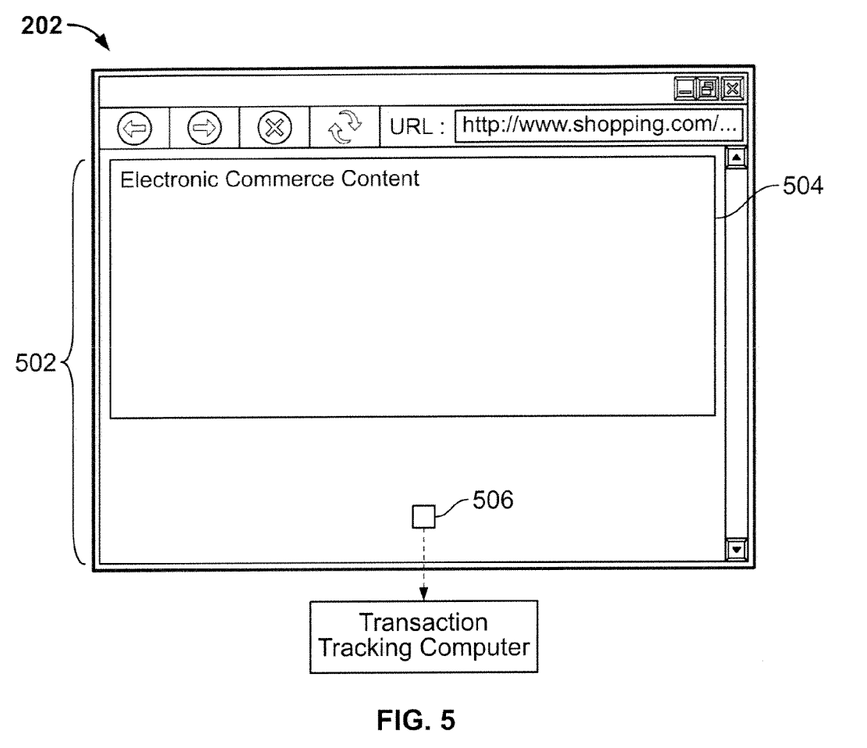
FIG. 5 is a diagram illustrating one example of a Web browser that is displaying a Web page from an electronic commerce computer.

Referring now to FIG. 5, there is shown a diagram of an exemplary user Web browser 202 displaying a Web page 502 from the electronic commerce computer. In FIG. 5, the Web page 502 includes visual electronic commerce content 504, which can include pictures, textual descriptions of merchandise, and/or user interface forms for example. The electronic commerce computer can include many different types of Web pages. For example, the Web pages can include multiple merchandise browsing pages, an account management page, a shopping cart page, a check-out page, and a purchase confirmation page, among others. As noted above herein, those skilled in the art will understand that a "Web page" refers to a collection of different things, including, for example, visual content displayed on a screen (e.g., text, picture, video, buttons, etc.), software code causing the visual content to be displayed, as well as other software code that do not cause anything to be displayed but perform certain functionality in connection with the Web page.

In accordance with one aspect of the disclosed technology, any of these Web pages can include software code that cause the user computer to report a transaction to the transaction tracking computer for recording. In one embodiment, if a user creates an account on the account management Web page, software code associated with the account management Web page can cause the user computer to report an account creation transaction to the transaction tracking computer for recording. In one embodiment, if a user browses a "daily specials" Web page, software code associated with the daily specials Web page can cause the user computer to report a daily specials browsing transaction to the transaction tracking computer for recording. In one embodiment, if a user makes a purchase on the electronic commerce computer, software code associated with a purchase confirmation Web page can cause the user computer to report a purchase transaction to the transaction tracking computer for recording. In one embodiment, the purchase transaction report can include a total value of the purchase. In one embodiment, the purchase transaction report can include an itemized list of purchased items and/or the number of each item purchased and/or the value of each item. These examples are merely illustrative, and other types of Web pages and transactions not specifically disclosed herein are also contemplated to be within the scope of the disclosed technology. In one aspect of the disclosed technology, the format, structure, and values for the transaction reports and for distinguishing between different types of transactions can be determined in advance by the transaction tracking computer. In this manner, different types of transactions can be tracked without need for consumer or marketplace surveys. Instead, software code associated with a Web page can report the transactions.

In one embodiment, the software code that reports a transaction to the transaction tracking computer is a script, which can be written in a programming language such Javascript. In one embodiment and as shown in FIG. 5, the software code is a "pixel beacon" 506, which is a 1×1 pixel "image" in a Web page that is hyperlinked to the transaction tracking computer. The hyperlink contains a URL in which the electronic address portion points to the transaction tracking computer and in which the data field portion includes the transaction to be reported. The transaction tracking computer can retrieve the reported transaction from the data field portion of the URL and can store the retrieved report. The transaction tracking computer cannot, however, send a confirmation that it received the reported transaction because the pixel beacon or script cannot receive confirmations. One skilled in the art would understand how to implement a script and/or a pixel beacon, and will understand that the transaction reporting will occur as the pixel beacon hyperlink or script code is being loaded into a user Web browser.

Figure 6:
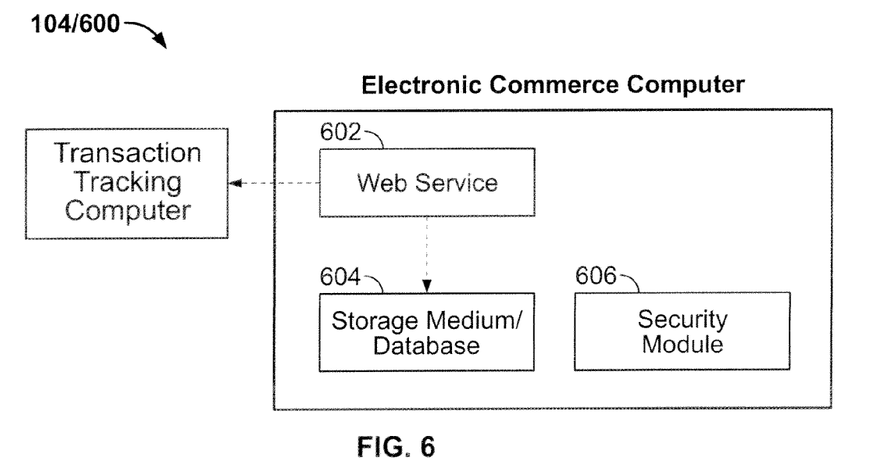
FIG. 6 is a block diagram of components in an exemplary electronic commerce computer.

In one aspect of the invention, the electronic commerce computer uses a Web service to report transactions to the transaction tracking computer, rather than using a pixel beacon or script. Referring to FIG. 6, there is shown a block diagram of an electronic commerce computer 600 that includes a Web service 602, a storage medium/database 604, and a security module 606. Those skilled in the art will recognize that a Web service is a method that allows the exchange of data between two different systems via a standard transfer protocol. The Web service 602 data transfer can use an HTTP, GET, or POST to send information about a transaction to the transaction tracking system. Those skilled in the art will recognize that a GET data transfer carries less capacity than a POST data transfer. In one embodiment, GET data transfers can be used to report non-SKU-based transactions. In one embodiment, GET data transfers can be used to report transactions for Lead Gen advertisers whose transactions contain a limited amount of data. In one embodiment, the electronic commerce computer 600 can include an API (application programming interface) for data formatting for both GET-based (compact name-value pairs) and POST-based (XML) transactions. In one embodiment, the Web service 602 can report a transaction to the transaction tracking computer for recording. After the transaction tracking computer records the transaction, it can send a confirmation to the Web service 602 that the transaction has been recorded. In one embodiment, the Web service 602 can store a copy of its reported transactions in its storage medium/database 604. In one embodiment, the Web service 602 can store a copy of its reported transactions in another storage medium/database (not shown) distinct from that of the transaction tracking computer. The storage medium/database 604 can contain Web pages. As described above herein, there may be many different types of Web pages and many different types of transactions. In one embodiment, the Web service 602 can report a transaction to the transaction tracking computer substantially right after the transaction occurs, i.e., the Web service 602 can report individual transactions without waiting for any subsequent transactions to occur. The security module 606 will be described in more detail later herein. The electronic commerce computer 600 can include hardware and software components not shown in FIG. 6, including hardware such as network communication devices, processors, memory, computer boards, optical or magnetic drives, and/or human interface devices, and software such as operating system software, Web server software, database management software, software supporting various communication protocols, and/or software supporting various programming languages.

Figure 7:
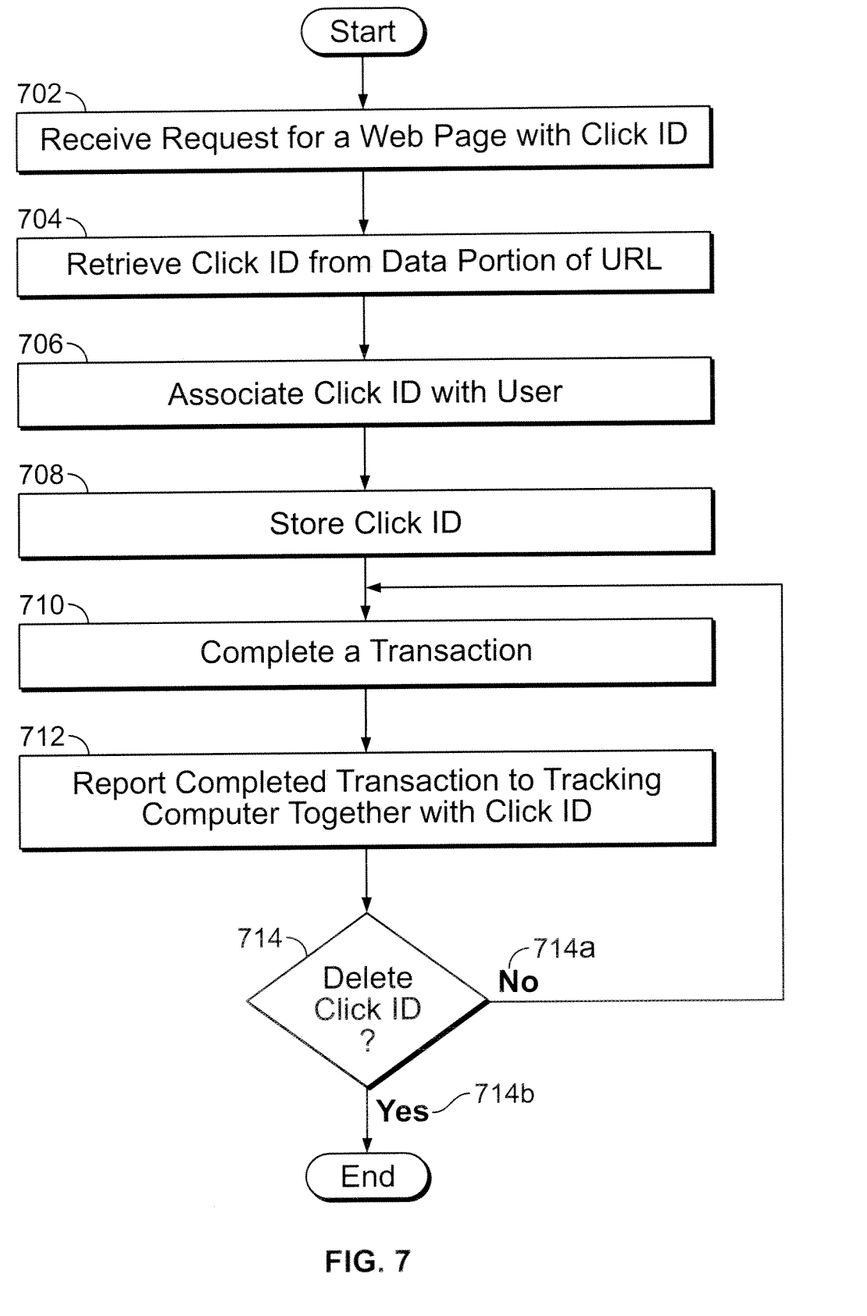
FIG. 7 is a flow chart illustration exemplary operations of the electronic commerce computer of FIG. 6.

In accordance with one aspect of the disclosed technology, the electronic commerce computer's reports to the transaction tracking computer include a clickID associated with the user engaging in the transaction. Referring now to FIG. 7, there is shown a flow chart of an exemplary process for reporting transactions with a clickID. When the electronic commerce computer receives a request for a Web page having a clickID in the URL (702), the electronic commerce computer can retrieve the clickID from the data portion of the URL (704). The clickID can be associated with the user (706) and can be stored (708). In one embodiment, these can both be accomplished by storing the clickID in a cookie (706, 708). When the user has completed a transaction (710), the electronic commerce computer can retrieve the clickID and report the transaction to the transaction tracking computer together with the clickID (712). In one embodiment, the electronic commerce computer can keep the clickID stored in the cookie after a transaction (714, 714*a*), so that further transactions by the same user will still be associated with the same clickID. In one embodiment, the electronic commerce computer can delete the clickID stored in the cookie after particular types of transactions (714, 714*b*). For example, in one embodiment, the electronic commerce computer may keep the clickID stored in the cookie for all transactions other than a purchase transaction, but may delete the clickID stored in the cookie after a purchase transaction.

In one aspect of the disclosed invention and with reference to FIG. 3, when the transaction tracking computer 300 receives a reported transaction, the transaction tracking computer 300 can match the clickID of the reported transaction to a clickID recorded in the storage medium/database 302. Once a match is identified, the clickID manager 306 can associate the reported transaction with the previously stored information from FIG. 4, step 402, i.e., information transmitted to the transaction tracking computer 300 in response to a user accessing an advertisement. In various embodiments, the reported transaction can be associated with a user identifier, a Web page server identifier, a Web page identifier, and/or an advertisement identifier.

In one aspect of the disclosed technology, the transaction tracking computer may offer different levels of tracking service. For example, for the most basic level of tracking service, the transaction tracking computer may only record purchase transactions. For the next higher level of service, the transaction tracking computer may record purchase transactions as well as account creation transactions, for example. With increasing levels of service, the transaction tracking computer can track more types of transactions and/or more transaction information. For example, at a higher service levels, the transaction tracking computer may record and/or the electronic commerce computer may record an itemized list of purchased items and/or the number of each item. On the other hand, at lower service levels, the transaction tracking computer may record only a total value of a purchase. In one embodiment, the transaction tracking computer can charge fees for different levels of tracking service. For example, higher levels of tracking service can correspond to higher service fees, while lower levels of tracking service can correspond to lower service fees.

What have been described thus far are systems and methods for tracking a user's access to an advertisement as well as systems and methods for tracking user transactions with an electronic commerce computer. The following paragraphs will describe security and/or fraud prevention features in the electronic commerce computer and the transaction tracking computer.

Referring now to FIG. 3, the transaction tracking computer 300 includes a security/fraud prevention module 308, which can be implemented as software. In one aspect of the disclosed technology, the security/fraud prevention module 308 performs duplicate checking on transactions that are reported to the transaction tracking computer 300 for recording. In one embodiment, the security/fraud prevention module 308 compares reported transactions with previously received transactions having the same clickID. If multiple transactions having the same clickID also have exactly the same information in other fields, then it is possible that a Web page refresh or a denial of service has caused the same transaction to be repeated. In that situation, the security/fraud prevention module 308 can mark the later duplicate transaction as being invalid. In one embodiment, the storage medium/database 302 can include a separate storage area for invalid transactions. In this manner, valid and invalid transactions are all recorded, but are separately recorded in different areas of the storage medium 302. In one embodiment, the security/fraud prevention module 308 compares reported transactions with earlier transactions received over a predetermined period of time to reduce the number of transactions that are compared. In one embodiment, advertising fees for an advertisement are computed only based on valid transactions related to that advertisement.

In one aspect of the disclosed technology, the security/fraud prevention module 308 and/or the clickID manager 306 includes a clickID timer. In one embodiment, the time when a clickID is generated is recorded. When the transaction tracking computer 300 receives a reported transaction having that clickID, the time when the transaction is received can be compared to the time when the clickID was generated, or their difference can be compared to a predetermined value. In one embodiment, the clickID becomes invalid after a predetermined time. Thus, if the difference in time is greater than the predetermined time, then the reported transaction is considered to be invalid. This aspect of the disclosed technology addresses fraudulent attempts to copy existing clickIDs and use them in non-existent, artificially created transactions. In one embodiment, the predetermined time can be tailored to the type of transaction. For example, the predetermined time for a purchase transaction can range from a few hours to a few days, whereas the predetermined time for a transaction of browsing a "daily specials" Web page can range from a few minutes to a few hours.

In another aspect of the disclosed technology, the security/fraud prevention module 308 includes software that tests the integrity of reported transactions. This feature protects against fraudulent agents that might be monitoring communications between the transaction tracking computer 300 and various electronic commerce computers. Such fraudulent agents may intercept reported transaction information communicated between the transaction tracking computer and the electronic commerce computer and replace them with false transaction information. In one embodiment, the disclosed technology can use a Checksum algorithm to verify the integrity of a reported transaction. The electronic commerce computer's security module 606 (FIG. 6) and the transaction tracking computer's security/fraud prevention module 308 can each include the same Checksum algorithm. When the electronic commerce computer 600 reports a transaction, it can apply the checksum algorithm to the transaction to be reported to generate a checksum value. The electronic commerce computer 600 can report the transaction and the checksum number to the transaction tracking computer 300. After receiving the transaction and checksum number, the transaction tracking computer can apply the checksum algorithm to the received transaction to compute a receive-side checksum number. If this receive-side checksum number matches the received checksum number, then the reported transaction is determined to be legitimate. In one embodiment, integrity testing can be based on a checksum algorithm as well as an encryption key. In this embodiment, the checksum value is generated by applying both the checksum algorithm and the encryption key to a transaction. These embodiments are merely exemplary, and one skilled in the art will recognize that other integrity checking systems and methods can be used. For example, in one embodiment, a checksum value need not be transmitted. Rather, the checksum value can be a predetermined value that is known to both the electronic commerce computer's security module 606 and the transaction tracking module's security/fraud prevention module 308. When the electronic commerce computer 600 desires to report a transaction, it can configure the transaction so that applying the checksum algorithm to the message at the transaction tracking computer 300 will result in the predetermined checksum value. Thus, if the reported transaction received at the transaction tracking computer 300 was fraudulently modified during transport, applying the checksum algorithm to the received transaction at the transaction tracking computer will not result in the predetermined checksum value. Other types of algorithms for testing integrity will be known to those skilled in the art and are contemplated to be within the scope of the disclosed technology.

In one embodiment, transactions that fail an integrity test can be stored in a separate log in the storage medium/database 302, apart from valid transactions, where they can be isolated and easily identified. In one embodiment, such transactions with non-matching checksums are not written to the storage medium/database 302, as doing so may allow writes of fraudulent data that could present a security hole. In one embodiment, a log of failed Checksums can be stored in the storage medium/database 302, which can be an archival medium like tape that is not instantly accessible. In one embodiment, the security/fraud prevention module 308 can provide a rollup count by day for advertisers that fail Checksum match. In one embodiment, the Checksum can be computed by the electronic commerce computer before it opens a purchase confirmation Web page. A central server or processor can provide open source code to advertisers to perform the computation. In one embodiment, although it is discouraged for advertisers to edit the checksum code, advertisers may make changes. Such changes could lead to non-commissionable transactions, which should be immediately evident. Each advertiser will have a means to report how many transactions did not match Checksum over a date range.

In one aspect of the disclosed technology and referring to FIG. 1, security measures are implemented to ensure that a valid electronic commerce computer 104 is reporting transactions. Security measures can include, for example, hashing and encryption. Hashing is a commonly used cryptographic function for checking the integrity of data transfers. By using a private key, the transaction tracking computer 110 can create a matching hash to the one provided by the electronic commerce computer 104 to validate the source of the data received. In one embodiment, if transaction tracking computer 110 created hash for the received data does not match the hash contained in the transfer, the data will be considered invalid and stored in a separate area from valid data. In one embodiment, keys are used that are hard to guess and are kept private, which provides a secure means of preventing the acceptance of forged data. In one embodiment, IP (internet protocol) restrictions can be used as a security measure. Referring to FIG. 3, the private key and encryption algorithm for the transaction tracking computer 300 can be maintained by the security/fraud prevention module 308. Referring to FIG. 6, the private key and encryption algorithm for the electronic commerce computer 600 can be maintained by the security module 606.

In one aspect of the disclosed technology, an electronic commerce computer can cancel transactions that have been reported to the transaction tracking computer. In one embodiment and with reference to FIG. 7, the electronic commerce computer can perform steps 710 and 712 as if it were reporting a completed transaction, but can replace reported values with their opposite values. For example, if the reported completed transaction was a purchase in the amount of $100, the cancellation transaction can be the exact same transaction except with an amount of −$100. In one embodiment, the transaction tracking computer will recognize a negative value as a cancellation transaction and match the cancellation transaction to its originally reported transaction.

In one embodiment, the transaction tracking computer 110 includes a cancellation tool that can be accessible to all advertisers 104. In one embodiment, the cancellation tool can be a Web page. The cancellation tool can allow advertisers 104 to see a list of its reported transactions and select a transaction it wishes to cancel. In one embodiment, selection of a transaction in the cancellation tool will lead to a cancellation confirmation page. In one embodiment, the cancellation can be recorded as a cancellation transaction that leads to a credit of any advertising fees due. All advertisers will have access to this cancellation tool. In one embodiment, if and advertiser would like to process a cancellation manually, it will simply provide the necessary information transaction information, and the cancellation will be reflected in advertiser and publisher online reports, by the following day.

Various embodiments of the disclosed technology have been described herein, and various embodiments are described below. The embodiments should not be considered to be mutually exclusive. It is contemplated that various embodiments can be combined.

In one aspect of the disclosed technology, there is provided a method for reducing recording of fraudulent transactions. In one embodiment, the method involves associating an identifier with an access of an electronic advertisement and with a first time stamp, receiving a report of an electronic commerce transaction involving the identifier, wherein the electronic commerce transaction is related to the electronic advertisement, and, in response to receiving the report, associating the identifier with a second time stamp. In one embodiment, the electronic commerce transaction is determined to be valid if the difference between said first time stamp and said second time stamp is less than or equal to a predetermined value, and determined to be invalid if the difference is greater than the predetermined value. In one embodiment, valid electronic commerce transactions can be stored. In one embodiment, the identifier can include a current date and a current time. In one embodiment, an advertising fee can be computed for the electronic advertisement based on a valid electronic commerce transaction.

In one embodiment of a method for reducing recording of fraudulent transactions, the method involves associating a unique identifier to each of a plurality of accesses to n advertisement, and receiving reports of a plurality of electronic commerce transactions related to the electronic advertisement, wherein each of the plurality of electronic commerce transactions is associated with one of the unique identifiers. In one embodiment, an electronic commerce transaction is determined to be valid or not valid based on the unique identifier associated with the electronic commerce transaction. Valid electronic commerce transactions can be stored in a storage medium. In one embodiment, an advertising fee can be computed for the electronic identifier based on only the valid electronic commerce transactions. In one embodiment, an electronic commerce transaction is invalid if the electronic commerce transaction is identical to another electronic commerce transaction associated with the same unique identifier.

In one aspect of the disclosed technology, there is provided a system for recording information regarding an electronic commerce transaction. In one embodiment, the system includes a transaction tracking computer that records information regarding electronic commerce transactions, an electronic commerce computer that provides a Web page for an online transaction, wherein the Web page includes software code that, when executed, communicates information regarding an electronic commerce transaction to the transaction tracking computer, and a user computer that receives the Web page and executes the software code upon loading the Web page. In one embodiment, the software code is either a pixel beacon or a script. In one embodiment, the electronic commerce transaction is a merchandise purchase. In one embodiment, the transaction tracking computer records information such as the total value of the merchandise. In one embodiment, the transaction tracking computer records information such as the number of units of the merchandise and a cost per unit of the merchandise.

In one embodiment of a system for recording information regarding an electronic commerce transaction, the system includes a transaction tracking computer that receives and records information regarding electronic commerce transactions, and an electronic commerce computer that includes a storage medium and Web service software, wherein the electronic commerce computer records information regarding an electronic commerce transaction in the storage medium and directs the Web service software to communicate the information to the transaction tracking computer. In one embodiment, the transaction tracking computer transmits a confirmation to the electronic commerce computer to indicate that it has recorded the information. In one embodiment, the Web service software implements one of: a GET command, and a POST command. In one embodiment, the electronic commerce transaction is a merchandise purchase. In one embodiment, the information regarding the electronic commerce transaction includes a total value of the merchandise. In one embodiment, the information regarding the electronic commerce transaction includes the number of units of the merchandise and a cost per unit of the merchandise. In one embodiment, the electronic commerce transaction directs the Web service software to communicate a cancellation transaction to the transaction tracking computer to cancel a previously recorded transaction.

Embodiments of the present invention comprise software and computer components and software and computer-implemented steps that will be apparent to those skilled in the art. For example, tracking, recording and communications can be performed, stored and transmitted electronically.

For ease of exposition, not every step or element of the present invention is described herein as part of software or computer system, but those skilled in the art will recognize that each step or element may have a corresponding computer system or software component. Such computer system and/or software components are therefore enabled by describing their corresponding steps or elements (that is, their functionality), and are within the scope of the present invention.

It will be appreciated that the present invention has been described by way of example only, and that the invention is not to be limited by the specific embodiments described herein. Improvements and modifications may be made to the invention without departing from the scope or spirit thereof.

What is claimed is:

1. A computed-implemented method for verifying the integrity of reported electronic commerce transactions comprising:
   providing remote access to a user over a network so the user can shop for goods or services in real time through a web browser on the user's computer;
   providing remote tracking of access by the user to an electronic advertisement;
   automatically directing, by a data-processor of a transaction tracking computer, the web browser on the user's computer to access a shopping web site hosted by an electronic commerce computer associated with the electronic advertisement, including:
      automatically sending, by the data-processor of the transaction tracking computer, via the network, a Uniform Resource Locator (URL) of the shopping web site to the user's computer, the shopping web site displaying goods or services in the web browser so the user can order and purchase electronically;
   receiving, via the network, by the data-processor of the transaction tracking computer, a transaction report associated with the electronic advertisement from the electronic commerce computer after the user completes an electronic transaction on the shopping web site, wherein the transaction report is configured to result in a predetermined checksum value when a predetermined checksum algorithm is applied;
   automatically applying, by the data-processor of the transaction tracking computer, the predetermined checksum algorithm to the received transaction report to generate a second checksum value;
   automatically storing, in an invalid transaction database associated with the transaction tracking computer contained in a non-transitory computer readable medium, data from the transaction report when the generated second checksum value is different than the predetermined checksum value; and
   automatically storing, in a valid transaction database associated with the transaction tracking computer separate from the invalid transaction database, data from the transaction report when the generated second checksum value is the same as the predetermined checksum value.

2. The computer-implemented method of claim 1, further comprising computing a commission for an advertiser associated with the electronic advertisement, if the generated second checksum value is the same as the predetermined checksum value.

3. The computer-implemented method of claim 1, further comprising canceling the transaction report if the generated second checksum value is different than the predetermined checksum value.

4. The computer-implemented method of claim 1, further comprising providing access to the invalid transaction database to a merchant associated with the transaction report or an advertiser associated with the transaction report.

5. The computer-implemented method of claim 4, wherein the advertiser or merchant has the ability to cancel a transaction listed in the accessed invalid transaction database.

6. The computer-implemented method of claim 1, wherein receiving the transaction report comprises receiving a file containing a reported transaction, and wherein the received file further comprises an encryption key.

7. The computer-implemented method of claim 1, further comprising:
  receiving, by the data-processor of the transaction tracking computer, an advertisement access notification from the user's computer informing the transaction tracking computer that the user is interested in accessing the electronic advertisement when the user clicks the electronic advertisement displayed in a web page hosted by a web page server;
  automatically generating, by the data-processor of the transaction tracking computer, a unique identifier identifying the advertisement access notification; and
  automatically transmitting, by the data-processor of the transaction tracking computer, the unique identifier to the user's computer for transmission by the user's computer to the electronic commerce computer.

8. The computer-implemented method of claim 1, further comprising:
  automatically transmitting, by the electronic commerce computer, the transaction report and the unique identifier, to the data-processor of the transaction tracking computer, after the user completes the electronic transaction on the shopping web site;
  automatically determining, by the data processor of the transaction tracking computer, whether the unique identifier transmitted by the electronic commerce computer matches with a unique identifier recorded in the non-transitory computer readable medium;
  automatically determining that the transaction report is valid when the unique identifier transmitted by the electronic commerce computer matches with a unique identifier recorded in the non-transitory computer readable medium;
  automatically associating, by the data processor of the transaction tracking computer, the transaction report with information previously stored in the non-transitory computer readable medium when the unique identifier transmitted by the electronic commerce computer matches with the unique identifier recorded in the non-transitory computer readable medium; and
  automatically determining that the transaction report is invalid when the unique identifier transmitted by the electronic commerce computer fails to match with any unique identifier recorded in the non-transitory computer readable medium.

9. A system for verifying the integrity of reported electronic commerce transactions comprising:
  a data-processor of a transaction tracking computer configured to:
    provide remote access to a user over a network so the user can shop for goods or services in real time through a web browser on the user's computer;
    provide remote tracking of access by the user to an electronic advertisement;
    automatically direct the web browser on the user's computer to access a shopping web site hosted by an electronic commerce computer associated with the electronic advertisement, including:
      automatically sending, by the data-processor of the transaction tracking computer, via the network, a Uniform Resource Locator (URL) of the shopping web site to the user's computer, the shopping web site displaying goods or services in the web browser so the user can order and purchase electronically;
    receive, via the network, a transaction report associated with the electronic advertisement from the electronic commerce computer after the user completes an electronic transaction on the shopping web site,
    wherein the transaction report is configured to result in a predetermined checksum value when a predetermined checksum algorithm is applied;
  the data-processor programmed to automatically apply the checksum algorithm to the received transaction report to generate a second checksum value;
  an invalid transaction database associated with the transaction tracking computer configured to automatically store data from the transaction report when the generated second checksum value is different than the predetermined checksum value; and
  a valid transaction database, associated with the transaction tracking computer, separate from the invalid transaction database, configured to automatically store data from the transaction report when the generated second checksum value is the same as the predetermined checksum value.

10. The system of claim 9, wherein the data-processor is further programmed to compute a commission for an advertiser associated with the electronic advertisement, if the generated second checksum value is the same as the predetermined checksum value.

11. The system of claim 9, wherein the data-processor is further programmed to cancel the transaction report if the generated second checksum value is different than the predetermined checksum value.

12. The system of claim 9, wherein the data-processor is further programmed to provide access to the invalid transaction database to a merchant associated with the transaction report or an advertiser associated with the transaction report.

13. The system of claim 12, wherein the advertiser or merchant has the ability to cancel a transaction listed in the accessed invalid transaction database.

14. The system of claim 9, wherein the network connection is configured to receive a file containing the transaction report, and wherein the received file further comprises an encryption key.

15. A non-transitory computer-readable storage medium with an executable program stored thereon, wherein the program instructs a data-processor of a transaction tracking computer to perform the following steps:
  providing remote access to a user over a network so the user can shop for goods or services in real time through a web browser on the user's computer;
  providing remote tracking of access by the user to an electronic advertisement;

automatically directing the web browser on the user's computer to access a shopping web site hosted by an electronic commerce computer associated with the electronic advertisement, including;
- automatically sending, via the network, a Uniform Resource Locator (URL) of the shopping web site to the user's computer, the shopping web site displaying goods or services in the web browser so the user can order and purchase electronically;

receiving, via the network, a transaction report associated with the electronic advertisement from the electronic commerce computer after the user completes an electronic transaction on the shopping web site,
- wherein the transaction report is configured to result in a predetermined checksum value when a predetermined checksum algorithm is applied;

automatically applying the predetermined checksum algorithm to the received transaction report to generate a second checksum value;

automatically storing, in an invalid transaction database associated with the transaction tracking computer contained in a non-transitory computer readable medium, data from the transaction report when the generated second checksum value is different than the predetermined checksum value; and automatically storing, in a valid transaction database associated with the transaction tracking computer separate from the invalid transaction database, data from the transaction report when the generated second checksum value is the same as the predetermined checksum value.

16. The non-transitory computer-readable storage medium of claim 15, wherein the program further instructs a data-processor to compute a commission for an advertiser associated with the electronic advertisement, if the generated second checksum value is the same as the predetermined checksum value.

17. The non-transitory computer-readable storage medium of claim 15, wherein the program further instructs a data-processor to cancel the reported transaction if the generated second checksum value is the same as the predetermined checksum value.

18. The non-transitory computer-readable storage medium of claim 15, wherein the program further instructs a data-processor to provide access to the invalid transaction database to a merchant associated with the transaction report or an advertiser associated with the transaction report.

19. The non-transitory computer-readable storage medium of claim 18, wherein the advertiser or merchant has the ability to cancel a transaction listed in the accessed invalid transaction database.

20. The non-transitory computer-readable storage medium of claim 15, wherein receiving the transaction report comprises receiving a file containing a reported transaction, and wherein the received file further comprises an encryption key.

* * * * *